US006222938B1

(12) United States Patent
Melen (10) Patent No.: US 6,222,938 B1
(45) Date of Patent: Apr. 24, 2001

(54) COMPENSATING PIXEL RECORDS OF RELATED IMAGES FOR DETECTING IMAGES DISPARITY, APPARATUS AND METHOD

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/082,606

(22) Filed: May 20, 1998

(51) Int. Cl.$^7$ ....................................... G06K 9/00
(52) U.S. Cl. ..................... 382/154; 382/168; 382/172; 382/194; 356/376; 356/390; 358/261.4; 358/427
(58) Field of Search ..................... 382/168, 171, 382/174, 194, 291; 358/427, 428, 261.4; 356/376, 390

(56) References Cited

U.S. PATENT DOCUMENTS 4,745,562 * 5/1988 Prazdny ................................ 364/551
5,719,954 * 2/1998 Onda ..................................... 382/154

* cited by examiner

Primary Examiner—Matthew C. Bella
Assistant Examiner—Sheela Chawan
(74) Attorney, Agent, or Firm—Fenwick & West LLP (57) ABSTRACT

Compensation data 10 distilled from image sample population volume 12 compensates pixel records 25R and 25L of related images 26R and 26L. Each pixel address stores a parameter code defining a parameter level for that pixel along a code scale of levels of a parameter such as greyscale common to both related images. The pixel records are enhanced through compensation of these parameter codes to provide enhanced disparity information. Pixel pairer 28P establishes a set of pixel pairs from the related pixel records in image correspondence. Sample generator 28G determines discrepancy between the code levels of each pixel pair to provide image population 12 of code discrepancy samples between the pixel records. Each pixel pair established from the two pixel records yields a difference sample in the image population. Profile extractor 28E extracts population profiles 12E of code discrepancy samples from image population 12. Each population profile is a vertical slice (see FIG. 1B) through the image population in a plane parallel to the Y (difference) axis. The profiles may be extracted for each of the greyscale levels, or from only selected parameter code levels. Profile reducer 28R reduces each population profile to a suitable single profile value 12R, one value for each parameter code level. Pixel compensator 28C is responsive to the series of single profile values to provide a series of difference points which form compensation data plot 10. The compensation data compensates the stored parameter codes to provide enhanced parameter codes which facilitate comparison of the parameter obtained from the related images. Comparer 29C is responsive to the parameter codes of each pixel pair of the compensated pixel records for detecting image disparity between the related images.

39 Claims, 4 Drawing Sheets

COMPENSATING PIXEL RECORDS OF RELATED IMAGES FOR DETECTING IMAGES DISPARITY, APPARATUS AND METHOD

TECHNICAL FIELD

This invention relates to compensating pixel records, and more particularly to such compensation for facilitating detecting image disparity between related images.

BACKGROUND

Heretofore image disparity between related images has been detected by comparing pixel pairs in image correspondence. Correlation or "tiling" techniques involving distance functions and matching tiles of perhaps 16×16 pixels (or other sub-array configurations) in each pixel record were employed to establish the pixel pairs. Typically the mean value of the greyscale variation across a reference tile in one pixel record was correlated with the mean value of the greyscale variation of a string of candidate tiles in the other pixel record. Each of the 16 pixels in the best matching candidate tile were considered to be in image correspondence with the corresponding 16 pixels in the reference tile. The image disparity between corresponding pixels is caused by XY address displacement in position between the pixel pairs. In stereoscopic view applications, the greyscale disparity between corresponding pixel pairs in the left/right related images (the signal) reveals depth information about each pixel pair. However, the imaging procedure of exposing the image to photo sensors recording the image onto the sensors and processing the recorded image, present inherent image-wide distortions introducing background noise which dilutes the depth signal. These prior disparity detection systems did not compensate for these distortions to increase the signal-to-noise ratio.

SUMMARY

It is therefore an object of this invention to provide apparatus and method which enhances pixel records of related images by compensating parameter codes therein for determining image disparity between the related images.

It is another object of this invention to provide such apparatus and method employing selected parameter code levels along the code scale of the compensated parameter.

It is a further object of this invention to provide such apparatus and method which permits iteration of the compensation process to further enhance the pixel records.

It is a further object of this invention to provide such apparatus and method which permits iteration termination independently on a code level by code level basis.

It is a further object of this invention to provide such apparatus and method which enhance multiple parameter codes in the pixel records.

Briefly, these and other objects of the present invention are accomplished by providing apparatus and method for compensating two pixel records of related images which facilitate comparison of a parameter obtained from the related images. A first memory contains a pixel record of a first related image, and a second memory contains a pixel record of a second related image. Each pixel record has pixel addresses. Each pixel address stores a parameter code defining a parameter level along a code scale of levels of a parameter common to the related images. A pairer establishes a set of pixel pairs in image correspondence. Each pair has a first pixel from an address in the first pixel record containing an increment of the first related image. Each pair also has a second pixel from a corresponding address in the second pixel record containing a corresponding increment of the second related image. A sample generator determines discrepancy between the code levels of each pixel pair in accordance with a discrepancy function. The sample generator provides animage population of code discrepancy samples between the pixel records. A profile extractor extracts a population profile of code discrepancy samples from the image population at each parameter code level to provide a series of population profiles. A profile reducer reduces each population profile to a single profile value. The profile reducer provides a series of single profile values, one value for each parameter code level. A pixel compensator responds to the series of single values to provide a series of compensation data, one compensation data for each parameter code level. The compensation data compensates the stored parameter codes to provide enhanced parameter codes which facilitate comparison of the parameter obtained from the related images.

BRIEF DESCRIPTION OF THE DRAWINGS

Further objects and advantages of the present compensation invention and the operation of the compensation apparatus and method will become apparent from the following detailed description and drawings (not drawn to scale) in which.

The first digit of each reference numeral in the above figures indicates the figure in which that element is most prominently shown. The second digit indicates related structural elements, and a final letter (when used) indicates a sub-portion of an element.

REFERENCE NUMERALS IN DRAWING

The table below lists all of the reference numerals employed in the figures, and identifies the element designated to by each numeral.

Figures 1A, 1B:
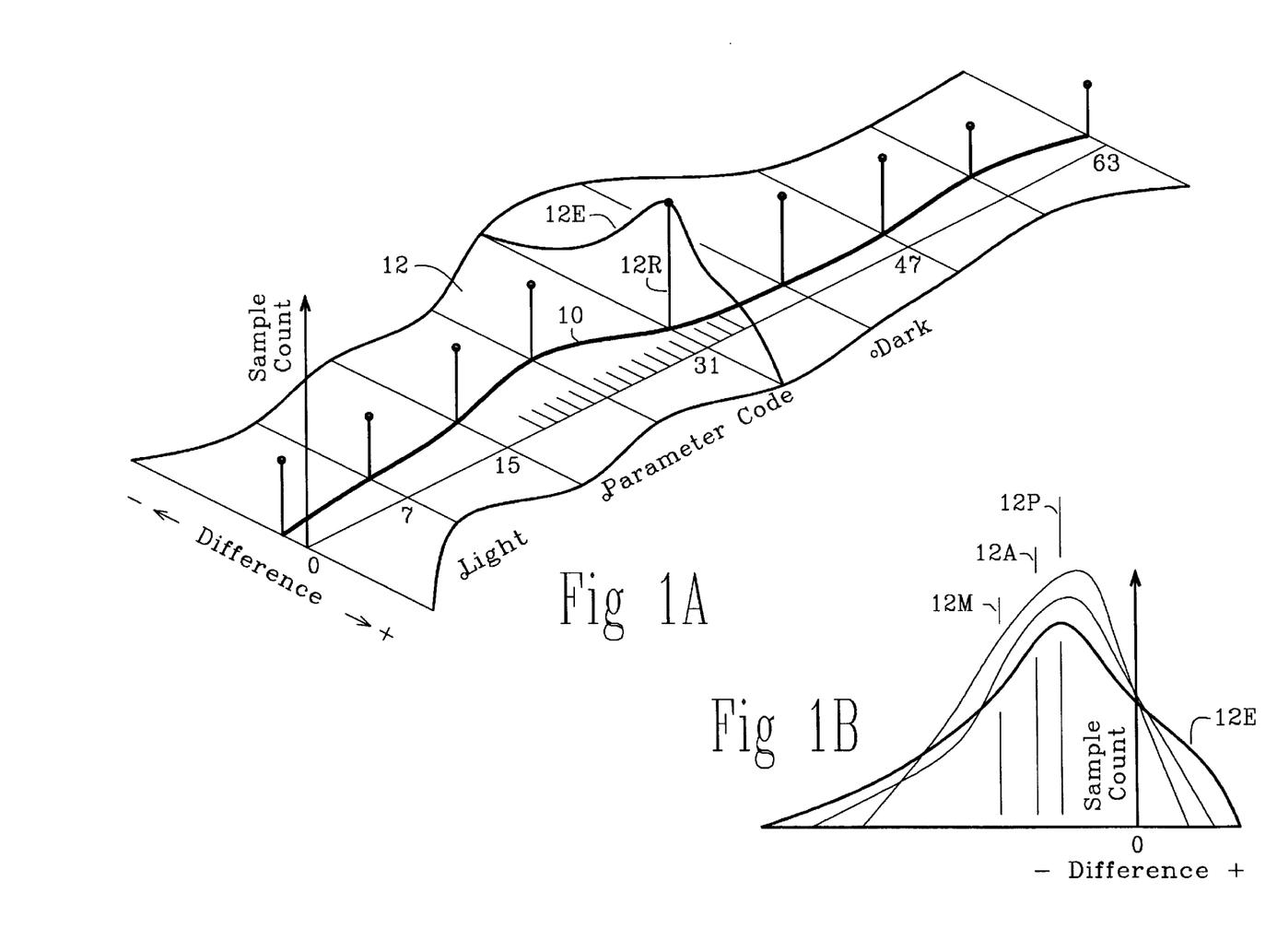
FIG. 1A is a perspective three axis plot of an image population 12 of pixel pair difference samples from two related images showing a parameter code (greyscale) along the X axis, code level difference between pixel pairs along the Y axis, and sample count of pixel pairs at each code level along the Z axis.
FIG. 1B is an two axis plot of a population profile 12E extracted from the image population of FIG. 1A, showing the median sample and the average value and the peak (mode) sample, of the profile for a particular code level.
Figure 2:
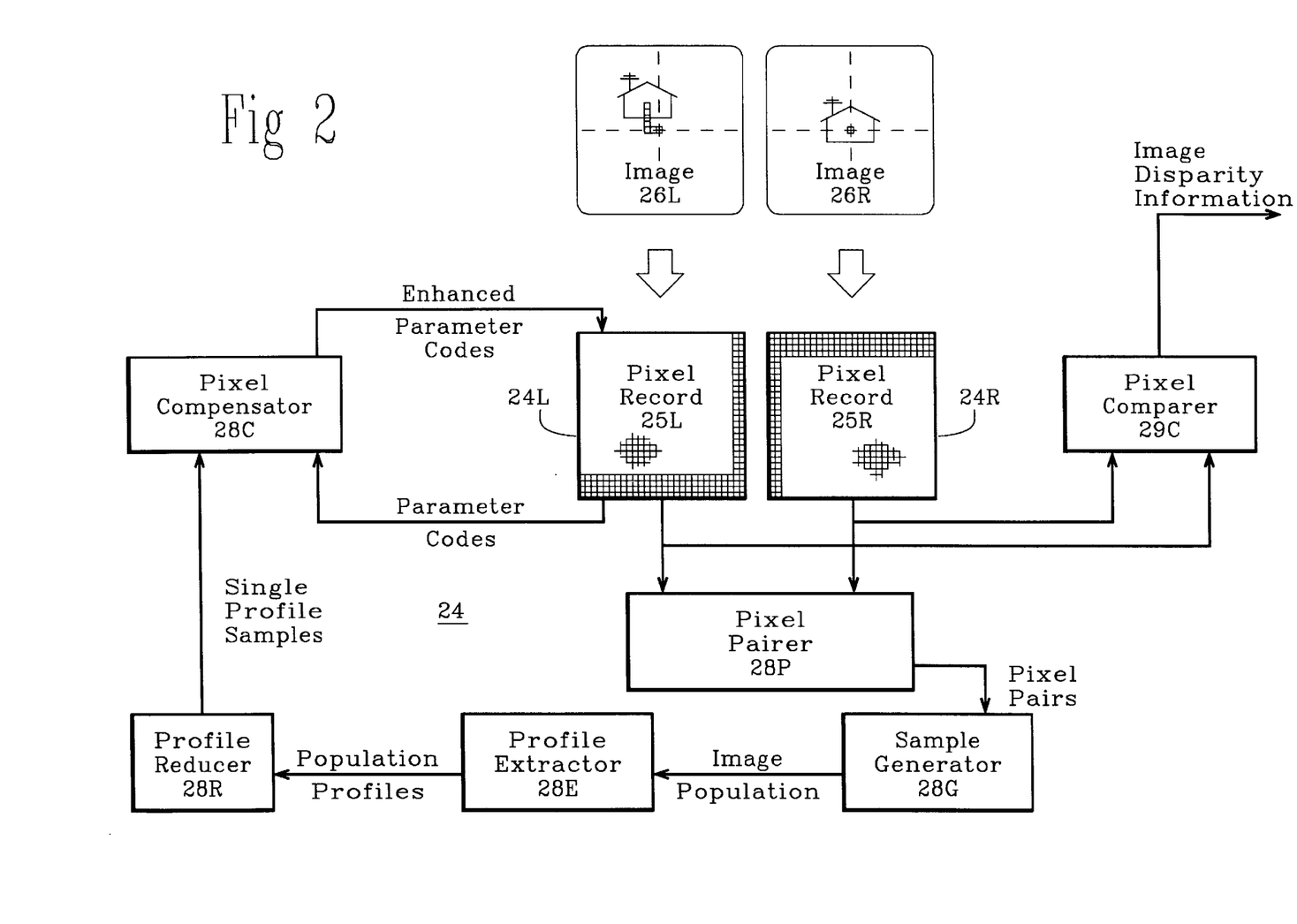
FIG. 2 is a block diagram of a general compensation system 24 showing related image inputs 26R and 26L and image disparity output information.

10 Compensation Data 10
12 Image Sample Population 12
12E Population Profile 12E
12R Single Profile Value 12R
12A Average Value 12A
12M Median Sample 12M 12P Peak Sample 12P
24 Compensation System 24
24R First Memory 24R
24L Second Memory 24L
25R Pixel Record 25R
25L Pixel Record 25L
26R Related Image Input 26R
26L Related Image Input 26L
28C Pixel Compensator 28C
28E Profile Extractor 28E
28G Sample Generator 28G
28P Pixel Pairer 28P
28R Profile Reducer 28R
29C Pixel Comparer 29C
34 Compensation System 34
34R First Memory 34R
34L Second Memory 34L
38C Pixel Compensator 38C
38E Profile Extractor 38E
38G Sample Generator 38G
38M Iteration Memory 38M
38P Pixel Pairer 38P
38R Profile Reducer 38R
38S Code Selector 38S
38T Terminator 38T
39C Pixel Comparer 39C General Compensation Embodiment
(FIGS. 1A 1B and 2)

Compensation data 10 distilled from image sample population volume 12 (see FIG. 1A very bold plot) compensates pixel records 25R and 25L of related images 26R and 26L (see FIG. 2). The compensated pixel records facilitate comparison of an imaging parameter (or parameters) obtained from the related images to provide enhanced disparity information. In a typical disparity application, the related images may be the left and right images of a stereoscopic view. The image disparity between pixel records reveals range or depth information. First memory 24R contains pixel record 25R of the first related image, and second memory 24L contains pixel record 25L of the second related image. The pixels forming the pixel records may have XY pixel addresses within the memories which present the images in XY bit map format. Alternatively, the pixel record may be in a data string or compressed format. Each pixel address stores a parameter code defining a parameter level for that pixel along a code scale of levels of a parameter such as greyscale common to both related images. The pixel records are enhanced through compensation of these parameter codes to provide enhanced disparity information.

Pixel pairer 28P establishes a set of pixel pairs from the related pixel records in image correspondence (see Image Correspondence section). Each pair has a first pixel from an address in the first pixel record containing an increment of the first related image. Each pair also has a second pixel from a corresponding address in the second pixel record containing a corresponding increment of the second related image.

Sample generator 28G determines discrepancy between the code levels of each pixel pair in accordance with a discrepancy function, to provide image population 12 of code discrepancy samples between the pixel records. The discrepancy function may be based on any suitable dissimilarity in the code levels, such as the subtractive mathematical difference between the code levels of each pixel pair (or weighted differences, or non-linear differences or other model by compensation). Each pixel pair established from the two pixel records yields a difference sample in the image population. The volume of samples under the surface of image population 12 is constant for each pair of related pixel records. In a pixel record having H horizontal rows of pixels (1280) by V vertical columns of pixels (1024), the maximum number of pixel pairs and difference samples is HxV=M samples (1,310,720). However field of view offsets between the related images reduces the number of pixel pairs. As shown in FIG. 2, image 26L is offset from image 26R by two pixels horizontally to the left and four pixels vertically upwards. The 6 offset pixels shown in image 26L as small squares, have been transposed from pixel record 25L to assist the reader in visualizing the offset. These six pixels are not part of image 26L. The field of view offset creates two columns and four rows of pixels along the edges of the pixel records which cannot be paired because the images do not overlap along these edges. These lost columns and rows of unpairable pixels are shown in pixel record 25R (left edge and top edge) and in pixel record 25L (right edge and bottom edge) for the readers assistance.

Profile extractor 28E extracts population profiles 12E of code discrepancy samples from image population 12. Each population profile is a vertical slice (see FIG. 1B) through the image population in a plane parallel to the Y (difference) axis. The profiles may be extracted for each of the 64 greyscale levels (0–63) shown in FIG. 1A providing a series of 64 population profiles. Alternatively, only selected parameter code levels may be employed such as every eighth greyscale level providing a series of eight population profiles as shown in FIG. 1A. Population profile 12E shown in FIG. 1B is from the 32nd code level. Profile reducer 28R reduces each population profile to a suitable single profile value 12R, one value for each parameter code level. Pixel compensator 28C is responsive to the series of single profile values to provide a series of difference points which form compensation data plot 10. The compensation data plot includes one compensation point at the code level for each extracted population profile. The compensation data compensates the stored parameter codes to provide enhanced parameter codes which facilitate comparison of the parameter obtained from the related images. Comparer 29C is responsive to the parameter codes of each pixel pair of the compensated pixel records for detecting image disparity between the related images.

Reducing the Population Profile

The single profile value reduced from the parent population profile may be a representative value (or sample) of the code differences of the pixel pairs at that code level. The single value may be median sample 12M or peak (mode) sample 12P as shown in FIG. 1B. The single value may not be a sample from the image population; but may be a synthesized number such average value 12A. Each single value forms a point of compensation data at each code level which compensates pixels of the same code level in the pixel records. Alternatively, the single values may not be representative of the profiles; but may be skewed single values employed to produce a particular effect on the compensation data and the pixel records. Prior to reducing the profiles to single values, the population profiles may be filtered to remove outlyers, which provides statistically more comprehensive compensation data.

Related Input Images

The related images may be positionally related. That is, the images may be a series of photographic exposures of the same scene taken at different positions, perhaps along the epipolar axis. Such a positional relationship is the basis of the photographs forming stereoscopic (3D) views. The disparity detected between positionally related images may reveal depth or range information. These positionally related photographs may be taken simultaneously by two (or several) cameras, or sequentially be a single camera.

The related images may be time related. That is, the image may be a sequence of photographic exposures of the same scene taken at different times. Such time relationship images readily yield change information such as object movement, illumination intensity, illumination angle, and color or size change. The disparity detected between time related images may reveal object velocity and acceleration.

The image parameter is commonly visible light which is easily captured in greyscale or color by conventional photography or other photo-sensors such as silicon CCDs. However, the parameter may be other forms of energy such as infra-red, sound, gradients of temperature or pressure or voltage or current, or even patterns of magnetic or electrostatic fields. Binary related images may produce greyscale pixel records after compensation due to the effect of pairing through tiling. A multi-parameter embodiment (see FIG. 3) may employ several of the above parameters. For example, a system for authenticating a specimen signature against a master signature on record may employ two parameters. The first parameter may be the conventional binary (or perhaps greyscale) visible image of both signatures. The second parameter may be a corresponding pen pressure pattern created during the execution of both signatures. Some abstract parameters such as the pressure pattern may not form comprehensive images as readily as the XY intensity type parameters.

Image Correspondence of Pixel Pairs

Image correspondence concerns the same increment of the image in the related images or related pixel records. Image correspondence is not the same a simple bit map correspondence which exists between pixels having identical addresses. Pixels from each pixel record in bit map correspondence occupy the same XY location in two memories. However, the image content at these bit map locations may not be the same. A shift in the field of view between two related images is carried into the two pixel records causing the same shift in image content of the bit maps. Pixels which do not have the same address, but which contain the same image increments are in image correspondence. The pairer establishes the pixel pairs only from pixels in image correspondence.

Selected Code Levels

Code selector 38S (see FIG. 3) selects certain code levels of the stored parameter codes along the code scale for population profiling by the profile extractor, and non-selects certain other code levels. Employing only selected code levels reduces the computation load and saves computation time because fewer profiles are extracted and reduced, and therefore fewer compensation data points are required. In an alternative full code embodiment, every code level has a population profile which is reduced to a single value forming compensation data for every code level.

The above code selection may be based on the geometry of the coordinate system or on simple mathematics. The selected code levels may be spaced at convenient intervals along the code scale of the stored parameter codes. The non-selected code levels are in the intervals between successive selected code levels. The spacing interval may be defined by a "Space" input to selector 38S, which may be changed to suit the compensation application. The selected code levels may be spaced at equal intervals such as the eight level spacing shown in FIG. 1A. In this equal interval embodiment, successive selected code levels have the same number of non-selected code levels therebetween.

Figures 3, 4:
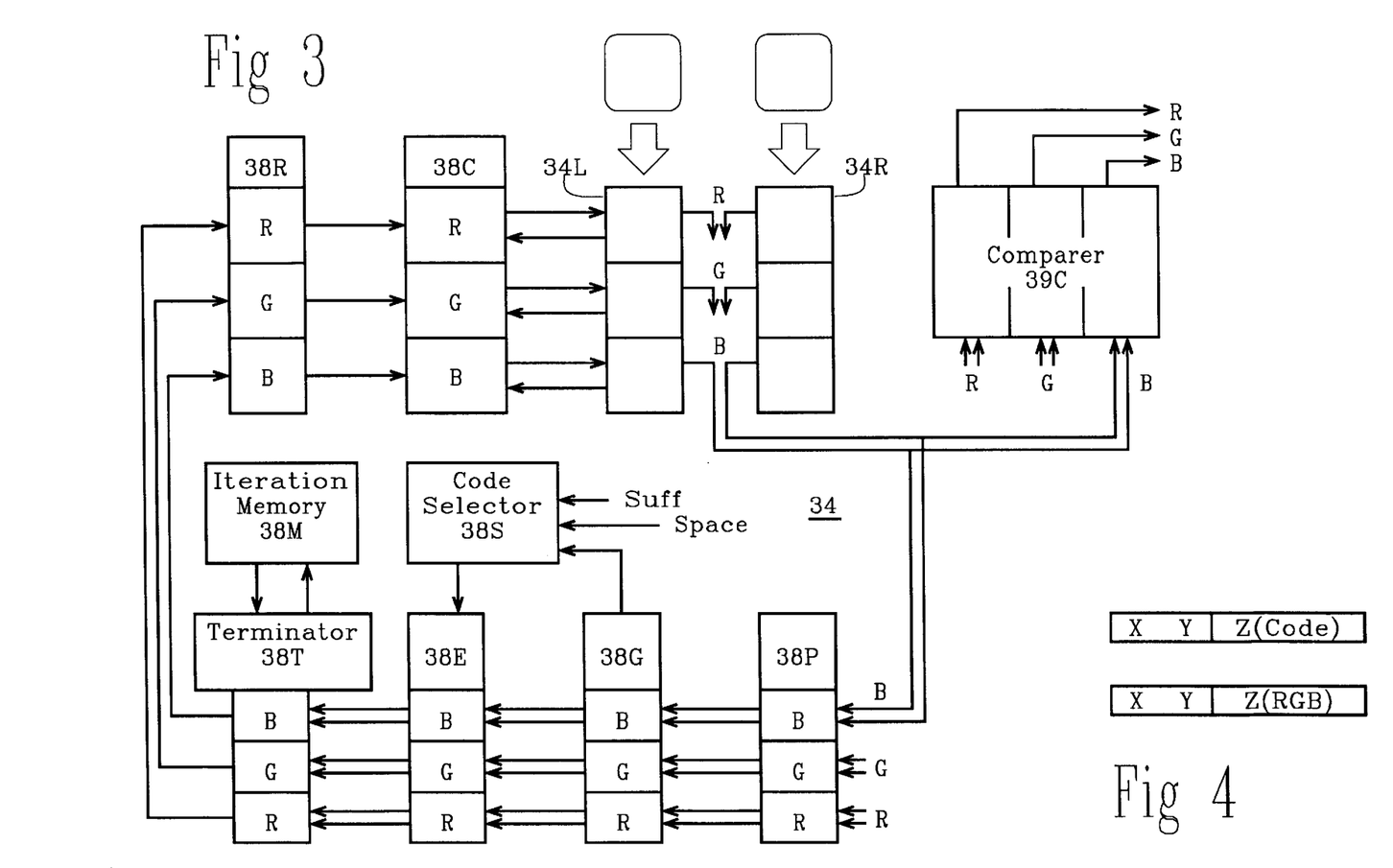
FIG. 3 is a block diagram of a more complex compensation system 34 showing color parameter codes (RGB) with code level selection and iteration cycle enhancement.
FIG. 4 shows the data format of various multiple parameter embodiments.

The code level selection may be based on the pixel pair statistics available at each code level. The selected code levels in this embodiment must have a sufficient number of code difference samples from the image population to provide a statistically significant population profile at each selected code level. The non-selected code levels then have a insufficient number of code difference samples. The sufficient number requirement may be defined by a "Suff" input to selector 38S, which may be changed to suit the compensation application. Pixels from "bland" low texture portions of the images have little or no change in greyscale, and are difficult to pair due to limitations of the tiling technique. The code levels in these bland areas may produce insufficient pixel pairs. Some code levels may simply be too rare in a given image to provide many pixel pairs. The code level data may be poor or missing causing a dearth of pixel pairs at some code levels. In number based selection the most prevalent codes levels are selected. These codes form most of the image and therefore provide the most important compensation data.

Compensation data for the non-selected codes may be supplied by curve fitting between the spaced points defined by the single values of successive detected levels. The curve fitting is based on the assumption that the image population and the population profiles and the series of single values are continuous functions, and are compatible with conventional curve fitting techniques such as the least squares and fitted polynomial methods. Curve fitting creates fitted single values for non-selected code levels between the successive selected code levels, providing a continuous series of single values along the parameter code scale to form continuous compensation data. Alternatively, the compensation data for the non-selected codes may be supplied by simple interpolation between the single values of successive selected code levels.

Multiple Parameter Code Embodiment
(FIGS. 3 and 4)

The parameter obtained from the related images may have multiple sub-parameters such as color (red green blue) each with sub-codes defining sub-levels along subcode scales. First memory 34R (and second memory 34L) may have sub-memories (RGB), each containing a pixel record of one of the multiple sub-parameters of the first (and second) related image. Pixel pairer 38P establishes multiple sub-sets (RGB) of pixel pairs, one sub-set for each sub-parameter. Sample generator 38G provides multiple sub-populations (RGB), one sub-population for each sub-set of pixel pairs. Profile extractor 38E provides multiple sub-profiles (RGB), one sub-profile for each sub-population. Profile reducer 38R provides multiple sub-series (RGB) of single values, one subseries for each sub-profile. Pixel compensator 38C provides multiple sub-series (RGB) of compensation data, one sub-series for each sub-series of single values for enhancing the sub-parameters in the pixel record. Pixel comparer 39C detects any image disparity in each of the sub-parameters of the related images.

In a alternative embodiment, the pixel pairer may combine the RGB sub-codes of the sub-parameters to establish a one set of greyscale pixel pairs. In this embodiment, the sample generator determines only one greyscale image population, the profile extractor provides only one series of greyscale population profiles, the profile reducer provides only one series of single values, and the pixel compensator provides only one series of greyscale compensation data.

In another embodiment, the RGB color is not combined into greyscale until after the pixel pairer. In this embodiment, the sample generator combines the sub-sets of pixel pairs to provide one image population. Thereafter, the profile extractor provides one series of population profiles, the profile reducer provides one series of single values, and the pixel compensator provides one series of compensation data.

In yet another embodiment, the RGB color is not combined into greyscale until after the sample generator. In this embodiment, the profile extractor combines the sub-populations to provide one series of population profiles. Thereafter, the profile reducer provides one series of single values, and the pixel compensator provides one series of compensation data.

In another embodiment, the RGB color is not combined into greyscale until after the profile extractor. In this embodiment, the profile reducer combines the sub-profiles to provide one series of single values, and the pixel compensator provides one series of compensation data.

In another embodiment, the RGB color is not combined into greyscale until after the profile reducer. In this embodiment, the pixel compensator combines the sub-series of single values to provide one series of compensation data.

A possible data format for the multiple parameter codes is shown in FIG. 4. The first few bits are the XY address within the memory. The next several bits contain the Z address or parameter code, which may be the RGB color data.

Figure 5:
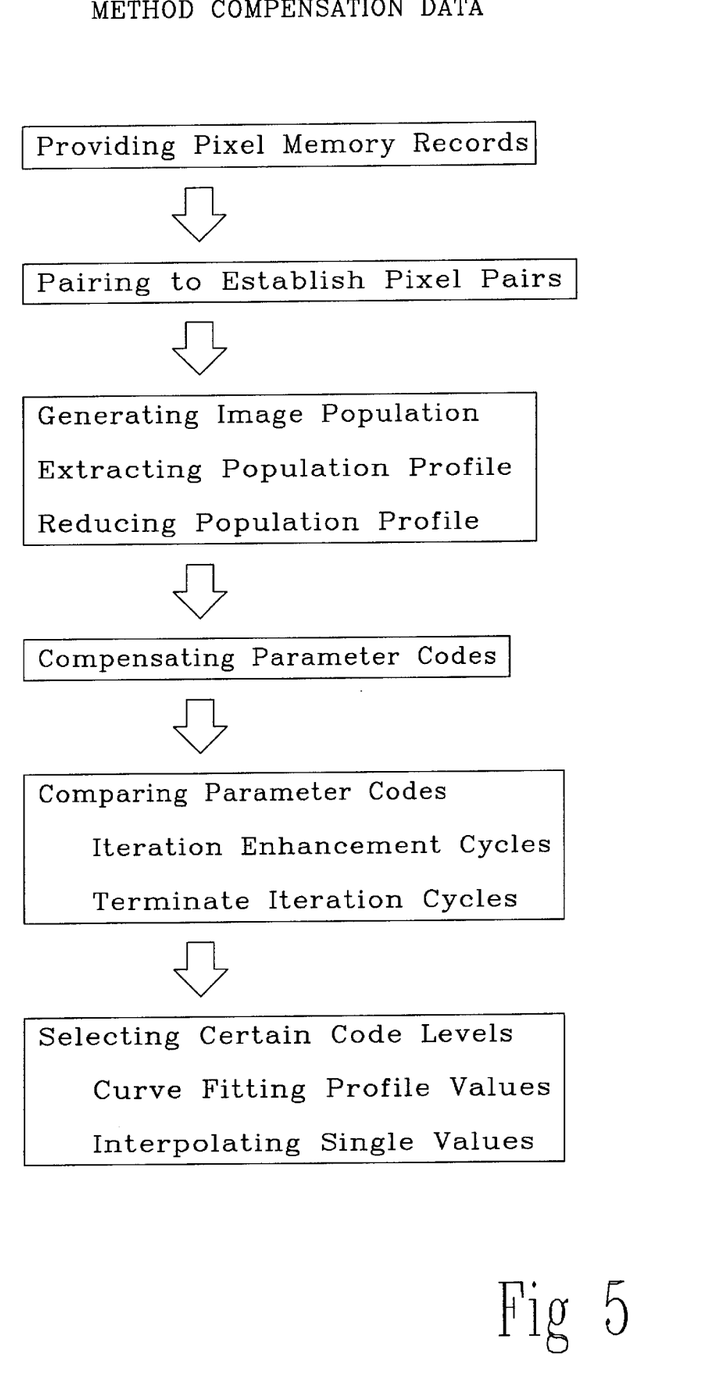
FIG. 5 is a flow chart showing the primary steps and sub-steps in a general method employed by the compensation systems of FIGS. 2 and 3.

Method of Compensation (FIG. 5)

The method for forming compensation data between two memory records of related images is illustrated in the flow chart of FIG. 5. The apparatus required for carrying out the above method is disclosed hereinbefore in connection with the detailed description of compensation system 24 (FIG. 2) and compensation system 34 (FIG. 3). The basic steps and sub-steps of the method are shown in FIG. 5 and described in detail below.

Providing pixel memory records of the related images.

Pairing to establish pairs of pixels in image correspondence from the memory records. The proper pairs may be known in advance, or determined from fiducial marks critically positioned on the related images, or established by the tiling techniques mentioned hereinbefore.

Generating an image population of code discrepancy samples between the memory records by calculating the difference in the stored parameter codes between the pixels of each pixel pair.

Extracting a population profile of code difference samples for parameter code levels from the image population.

Reducing each population profile to a single profile value along each population profile; and Forming compensation data from the single profile values for compensation between memory records.

Compensating the stored parameter codes using the compensation data to provide enhanced stored parameter codes which facilitate comparison of the parameter obtained from the related images. In one embodiment, the image population may be generated by subtracting the parameter codes of the second memory record from the parameter codes of the first memory record. In this first minus second memory record embodiment each step is directed toward a code level of the second memory record. That is, the image population is generated and the population profiles are extracted and the single values are reduced and the compensation data are formed for the second memory record code levels. The compensation data is added to code levels of the second memory record to compensate the second memory record relative to the first memory record. In a one-half compensation embodiment, the compensation data is one half of the single values, and is subtracted from the first memory record at each code level and added to the second memory record at each code level to compensate the first memory record and the second memory record relative to each other.

Comparing the parameter codes of each pixel pair of the compensated memory records for detecting image disparity between the related images stored in the memory records.

Iteration Enhancement

After the compensating step, the entire process may be repeated through an iteration cycle using the enhances parameter codes to establish enhanced pixel pairs, generate an enhanced image population, extract enhanced population profiles, reduce enhanced single values, and form enhanced compensation data which further enhances the parameter codes. As the iteration cycles proceed and noise is reduced, the sample differences become less causing the image population to narrow along the X (difference) axis. Also the compensation data plot moves closer to the Y (parameter code) axis. After several iteration tiles candidate tile which were resistant to matching to the reference tiles, may become matched producing more pixel pairs. Several iterations of enhanced population profiles are shown in FIG. 1B (light plots) which peak higher than the original profile 12E (bold plot) and closer to the Z (Count Sample) axis.

Termination of the Iteration Cycle

The iteration cycle may be terminated by terminator 38T after a fixed number of iteration cycles. Alternatively, the iteration cycle may be terminated when the enhancement by iteration is less than a predetermined enhancement, or approaches statistical insignificance. Iteration memory 38M retains the profiles from the previous iteration for comparison to the profiles of the current iteration to monitor the advancement of the compensation data. The iteration cycle may be terminated at all code levels simultaneously, or terminated separately code level by code level as the enhancement by iteration for each code level advances.

Selecting Codes Level

The following additional steps concerning code selection may be employed before the step of forming the compensation data.

Selecting certain code levels of the stored parameter codes along the code scale for inclusion in the subsequent steps. The non-selected code levels are excluded from the subsequent steps. The selecting step may be after the pairing step and before the reducing step.

Curve fitting the single profile values of successive selected code levels to create fitted single values for non-selected code levels between the successive selected code levels.

Interpolating the single values of successive selected code levels to create interpolated single values for non-selected code levels between the successive selected code levels.

Industrial Applicability

It will be apparent to those skilled in the art that the objects of this invention have been achieved as described hereinbefore by providing apparatus and method which enhances pixel records of related images by compensating parameter codes therein for determining image disparity between the related images. In one embodiment only selected parameter code levels along the code scale of the compensated parameter were employed to simplify and reduce the computation load of the system. In another embodiment iteration of the compensation process further enhanced the pixel records, which may be terminated on a code level by code level basis.

Conclusion

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

What is claimed is:

1. Apparatus for compensating two pixel records of related images which facilitate comparison of a parameter obtained from the related images, comprising:

a first memory containing a pixel record of a first related image;

a second memory containing a pixel record of a second related image;

each pixel record having pixel addresses, each pixel address storing a parameter code defining a parameter level along a code scale of levels of a parameter common to the related images;

pairer for establishing a set of pixel pairs in image correspondence, each pair having a first pixel from an address in the first pixel record containing an increment of the first related image, each pixel having a second pixel from a corresponding address in the second pixel record containing a corresponding increment of the second related image;

sample generator for determining discrepancy between the code levels of each pixel pair in accordance with a discrepancy function, to provide an image population of code discrepancy samples between the pixel records;

profile extractor for extracting a population profile of code discrepancy samples from the image population at each parameter code level to provide a series of population profiles;

profile reducer for reducing each population profile to a single profile value to provide a series of single profile values, one value for each parameter code level; and pixel compensator responsive to the series of single values to provide a series of compensation data, one compensation data for each parameter code level, for compensating the stored parameter codes to provide enhanced parameter codes which facilitate comparison of the parameter obtained from the related images.

2. The apparatus claim 1, wherein the discrepancy function is the subtractive mathematical difference between the code levels of each pixel pair.

3. The apparatus claim 1, further comprising: comparer responsive to the parameter codes of each pixel pair of the compensated pixel records for detecting image disparity between the related images.

4. The apparatus of claim 1, further comprising: selector for selecting certain code levels of the stored parameter codes along the code scale for population profiling by the profile extractor, and for non-selecting certain other code levels.

5. The apparatus claim 1, wherein:

the parameter obtained from the related images has multiple sub-parameters each with sub-codes defining sub-levels along a sub-code scale;

the first memory has sub-memories each containing a pixel record of one of the multiple sub-parameters of the first related image;

the second memory has sub-memories each containing a pixel record of one of the multiple sub-parameters of the second related image.

6. The apparatus claim 5, wherein:

the pairer combines the sub-codes of the sub-parameters to establish a one set of pixel pairs;

the sample generator determines one image population;

the profile extractor provides one series of population profiles;

the profile reducer provides one series of single profile values; and the pixel compensator provides one series of compensation data.

7. The apparatus claim 5, wherein the pairer establishes multiple sub-sets of pixel pairs, one sub-set for each sub-parameter.

8. The apparatus claim 7, wherein:

the sample generator combines the sub-sets of pixel pairs to provide one image population;

the profile extractor provides one series of population profiles;

the profile reducer provides one series of single profile values; and the pixel compensator provides one series of compensation data.

9. The apparatus claim 7, wherein the sample generator provides multiple sub-populations, one sub-population for each sub-set of pixel pairs.

10. The apparatus claim 9, wherein:

the profile extractor combines the sub-populations to provide one series of population profiles;

the profile reducer provides one series of single profile values; and the pixel compensator provides one series of compensation data.

11. The apparatus claim 9, wherein the profile extractor provides multiple sub-profiles, one sub-profile for each sub-population.

12. The apparatus claim 11, wherein:

the profile reducer combines the sub-profiles to provide one series of single profile values; and the pixel compensator provides one series of compensation data.

13. The apparatus claim 11, wherein the profile reducer provides multiple sub-series of profile values, one sub-series for each sub-profile.

14. The apparatus claim 13, wherein the pixel compensator combines the sub-series of single profile values to provide one series of compensation data.

15. The apparatus claim 13, wherein the pixel compensator provides multiple sub-series of compensation data, one sub-series for each sub-series of single values.

16. Apparatus for compensating two pixel records of related images which facilitate comparison of a parameter obtained from the related images, comprising:

first memory means containing a pixel record of a first related image;

second memory means containing a pixel record of a second related image;

each pixel record having pixel addresses, each pixel address storing a parameter code defining a parameter level along a code scale of levels of a parameter common to the related images;

pairer means for establishing a set of pixel pairs in image correspondence, each pair having a first pixel from an address in the first pixel record containing an increment of the first related image, each pixel having a second pixel from a corresponding address in the second pixel record containing a corresponding increment of the second related image;

sample generator means for determining discrepancy between the code levels of each pixel pair in accordance with a discrepancy function, to provide an image population of code discrepancy samples between the pixel records;

profile extractor means for extracting a population profile of code discrepancy samples from the image population at each parameter code level to provide a series of population profiles;

profile reducer means for reducing each population profile to a single profile value to provide a series of single profile values, one value for each parameter code level;

pixel compensator means responsive to the series of single values to provide a series of compensation data, one compensation data for each parameter code level, for compensating the stored parameter codes to provide enhanced parameter codes; and comparer means responsive to the enhanced parameter codes of each pixel pair of the compensated pixel records for comparing the parameter obtained from the related images to detect image disparity of the parameter between the related images.

17. Method for forming compensation data between two memory records of related images which facilitate comparison of a parameter obtained from the related images, comprising the steps of:

providing a first pixel memory record of a first related image, and a second pixel memory record of a second related image, each memory record having pixel addresses, each pixel address storing a parameter code defining a parameter level along a code scale of levels of a parameter of the related images;

pairing to establish pairs of pixels in image correspondence, each pair having a first pixel from an address in the first memory record containing an increment of the first related image, and having a second pixel from a corresponding address in the second memory record containing a corresponding increment of the second related image;

generating an image population of code discrepancy samples between the memory records by calculating the difference in the stored parameter codes between the pixels of the set of pixel pairs;

extracting a population profile of code difference samples for parameter code levels from the image population;

reducing each population profile to a single profile value along each population profile; and forming compensation data from the single profile values for compensation between memory records which facilitate comparison of the parameter.

18. The method of claim 17, further comprising after the forming step, the additional step of:

compensating the stored parameter codes using the compensation data to provide enhanced stored parameter codes which facilitate comparison of the parameter obtained from the related images.

19. The method of claim 18, wherein:

the image population is generated by subtracting the parameter codes of the second memory record from the parameter codes of the first memory record;

image population is generated and the population profiles are extracted and the single values are reduced and the compensation data are formed for the code levels of the second memory record; and the compensation data is added to code levels of the second memory record to compensate the second memory record relative to the first memory record.

20. The method of claim 18, wherein:

the compensation data is one half of the single values; and the compensation data is subtracted from the first memory record at each code level and added to the second memory record at each code level to compensate the first memory record and the second memory record relative to each other.

21. The method of claim 18, further comprising after the compensating step, the following steps are repeated through an iteration cycle:

the pairing step
using the enhanced parameter codes;

the generating step;

the extracting step;

the reducing step;

the forming step to provide enhanced compensation data; and the compensating step to provide further enhanced parameter codes.

22. The method of claim 21, wherein the iteration cycle is terminated after a fixed number of iteration cycles.

23. The method of claim 21, wherein the iteration cycle is terminated when the enhancement by iteration is less than a predetermined enhancement.

24. The method of claim 21, wherein the iteration cycle is terminated when the enhancement by iteration approaches statistical insignificance.

25. The method of claim 21, wherein the iteration cycle is terminated code level by code level as the enhancement by iteration for each code level advances.

26. The method of claim 18, wherein further comprising after the compensating step, the additional step of:

comparing the parameter codes of each pixel pair of the compensated memory records for detecting image disparity between the related images stored in the memory records.

27. The method of claim 17, wherein every parameter code level of the parameter code scale has a population profile which is reduced to a single value forming compensation data for that parameter code level.

28. The method of claim 17, further comprising before the forming step, the additional steps of:

selecting certain code levels of the stored parameter codes along the code scale for inclusion in the subsequent steps; and non-selecting certain other code levels of the stored parameter codes along the code scale for exclusion from the subsequent steps.

29. The method of claim 28, wherein:

the selecting step is before the reducing step;

the selected code levels that have a sufficient number of code difference samples from the image population to provide a statistically significant population profile at each selected code level; and the non-selected code levels that have a insufficient number of code difference samples from the image population to provide a statistically significant population profile at each non-selected code level.

30. The method of claim 28, wherein the selecting step is after the pairing step.

31. The method of claim 30, wherein:

the selected code levels are spaced at intervals along the code scale of the stored parameter codes; and the non-selected code levels are in the intervals between successive selected code levels.

32. The method of claim 31, wherein the spaced selected code levels are spaced at equal intervals, and successive selected code levels have the same number of non-selected code levels therebetween.

33. The method of claim 28, further comprising after the reducing step, the additional step of:

curve fitting the single values of successive selected code levels to create fitted single values for non-selected code levels between the successive selected code levels, providing a continuous series of single values along the parameter code scale to form continuous compensation data.

34. The method of claim 28, further comprising after the reducing step, the additional step of:

interpolating the single values of successive selected code levels to create interpolated single values for non-selected code levels between the successive selected code levels, providing a continuous series of single values along the parameter code scale to form continuous compensation data.

35. The method of claim 17, wherein the single profile value of the population profile of each code level is a representative value of the code differences of the pixel pairs at that code level.

36. The method of claim 35, wherein the representative value is the median sample of that population profile.

37. The method of claim 35, wherein the representative value is the average value of that population profile.

38. The method of claim 35, wherein the representative value is the mode sample of that population profile.

39. A computer readable medium containing a computer program that forms compensation data between two memory records of related images which facilitate comparison of a parameter obtained from the related images, by directing the computer to execute the steps of:

providing a first pixel memory record of a first related image, and a second pixel memory record of a second related image, each memory record having pixel addresses, each pixel address storing a parameter code defining a parameter level along a code scale of levels of a parameter of the related images;

pairing to establish pairs of pixels in image correspondence, each pair having a first pixel from an address in the first memory record containing an increment of the first related image, and having a second pixel from a corresponding address in the second memory record containing a corresponding increment of the second related image;

generating an image population of code discrepancy samples between the memory records by calculating the difference in the stored parameter codes between the pixels of the set of pixel pairs;

extracting a population profile of code difference samples for parameter code levels from the image population;

reducing each population profile to a single profile value along each population profile; and forming compensation data from the single profile values for compensation between memory records which facilitate comparison of the parameter.

\* \* \* \* \*